United States Patent [19]

Merle

[11] Patent Number: 5,573,196
[45] Date of Patent: Nov. 12, 1996

[54] CARTRIDGE AND METHOD FOR ATTACHING OR DETACHING A FILMSTRIP TO A FILM CARTRIDGE

[75] Inventor: Thomas C. Merle, Rochester, N.Y.

[73] Assignee: Eastman Kodak Company, Rochester, N.Y.

[21] Appl. No.: 171,947

[22] Filed: Dec. 22, 1993

[51] Int. Cl.$^6$ .................................... G03B 23/02
[52] U.S. Cl. .................. 242/348.1; 242/532.4; 242/532.7; 242/584.1
[58] Field of Search .............. 242/348.1, 348.4, 242/532.4, 532.7, 562, 562.1, 584.1; 354/275

[56] References Cited

U.S. PATENT DOCUMENTS

| | | | |
|---|---|---|---|
| 2,731,894 | 1/1956 | Leitz et al. | ..................... 95/31 |
| 3,481,552 | 12/1969 | Gersch et al. . | |
| 3,586,258 | 6/1971 | Horlezeder . | |
| 3,633,842 | 1/1972 | Rissberger . | |
| 3,921,278 | 11/1975 | Basu | ................. 242/562.1 X |
| 4,138,068 | 2/1979 | Kinoshita | ............. 242/562 X |
| 4,221,479 | 9/1980 | Harvey | ................. 354/275 |
| 4,420,120 | 12/1983 | Raymond . | |
| 4,506,843 | 3/1985 | Luhrig et al. | ............ 242/584.1 |
| 4,852,821 | 8/1989 | Harris et al. | ............ 242/584.1 |
| 4,938,429 | 7/1990 | Robertson et al. . | |
| 4,962,401 | 10/1990 | Takahashi . | |
| 5,031,852 | 7/1991 | Dowling et al. . | |
| 5,181,671 | 1/1993 | Mizuno . | |
| 5,200,777 | 4/1993 | Zander | ................. 354/275 |
| 5,215,273 | 6/1993 | Greene . | |
| 5,232,633 | 8/1993 | Ilardi et al. . | |
| 5,348,239 | 9/1994 | Enomoto | ............. 242/348.4 |
| 5,360,183 | 11/1994 | Takahashi et al. | ........... 242/584.1 X |

FOREIGN PATENT DOCUMENTS

| | | |
|---|---|---|
| 0582852 | 2/1994 | European Pat. Off. . |
| 248666 | 4/1986 | German Dem. Rep. . |
| 4-123048 | 4/1992 | Japan . |
| 4-122925 | 4/1992 | Japan . |

Primary Examiner—Daniel P. Stodola
Assistant Examiner—William A. Rivera
Attorney, Agent, or Firm—Frank Pincelli

[57] ABSTRACT

A cartridge and method for attaching or detaching a filmstrip to a cartridge. The film cartridge includes a spool rotatably mounted therein and an opening for allowing a filmstrip to be inserted or removed therefrom. The cartridge also includes a moveable section with respect for the cartridge which does not substantially effect the operation of the spool and a locking mechanism for locking and unlocking the moveable section with respect to the cartridge. The moveable section forms an access opening for allowing inserting of a tool for attaching or detaching the filmstrip to the spool.

8 Claims, 4 Drawing Sheets

CARTRIDGE AND METHOD FOR ATTACHING OR DETACHING A FILMSTRIP TO A FILM CARTRIDGE

CROSS REFERENCE TO RELATED APPLICATIONS

Reference is made to commonly assigned copending application Ser. No. 08/098,112, filed Jul. 27, 1993, entitled "A Tool and Method For Detaching a Trailing End Portion of a Filmstrip From a at Least One Hook Atop a Ramp on a Film Spool Inside a Film Cartridge", by Thomas C. Merle, Dale W. Ryan and David L. Rowden; and Ser. No. 08,171, 790, entitled "Method and Apparatus For Attaching or Detaching a Filmstrip to a Film Cartridge", by Thomas C. Merle and Dale W. Ryan. Both of the above applications are hereby incorporated by reference.

FIELD OF THE INVENTION

The present invention relates to a method for attaching or detaching a filmstrip to a cartridge.

BACKGROUND OF THE INVENTION

Prior art mechanism for attaching or detaching a filmstrip to a cartridge rely on the precise positioning of the cartridge and the tool used during the attachment or detachment procedure. The foregoing technique imposes tight restrictions on the cartridge specification, the manufacturing techniques used to make the cartridge, the precise manufacturing of the tool and mechanism used for engaging the tool with the cartridge so as to ensure proper orientation between the tool and cartridge. Certain cartridges, such as the type disclosed in U.S. Pat. Nos. 5,215,273 and 5,013,852, require significant spacing between internal cartridge features for allowing attachment of the filmstrip directly to the spool.

Thus, there exists a problem in providing a method and apparatus which allows for the attachment or removal of a filmstrip without accounting for precise control between the tool and cartridge.

SUMMARY OF THE INVENTION

In one aspect of the present there is provided a method of attaching or detaching a filmstrip to a film cartridge having a spool rotatably mounted therein and an opening for allowing the filmstrip to be inserted or removed therefrom. The cartridge also includes a moveable section with respect for the cartridge which does not substantially effect the operation of the spool. A lock mechanism is provided for locking and unlocking the moveable section with respect to the cartridge. The method comprises the steps of:

a. opening the moveable section so as to form an access opening for allowing attachment or detachment of the filmstrip to the spool;

b. providing a tool designed to attach or detach a filmstrip with respect to the spool;

c. moving the tool into the cartridge through the access opening to a predetermined position for allowing attachment or detachment of the filmstrip;

d. attaching or detaching the filmstrip to the spool;

e. inserting or removing the filmstrip from the cartridge through the access opening;

f. removing the tool from the cartridge; and g. closing the moveable section so as to return the cartridge to its normal closed position.

The present invention is directed to an apparatus and a method for attaching or detaching a filmstrip from a cartridge which eases the restrictions on the tolerances of the cartridge, the equipment used to manufacture the cartridge and the alignment of the tools used to attach or detach the filmstrip with respect to the cartridge.

DETAILED DESCRIPTION OF THE DRAWINGS

Referring the FIG. 1, there is illustrated an exploded perspective view of a cartridge made in accordance with the present invention;

Referring to FIG. 2, there is illustrated a perspective view of the cartridge of FIG. 1;

DETAILED DESCRIPTION

Figure 1:
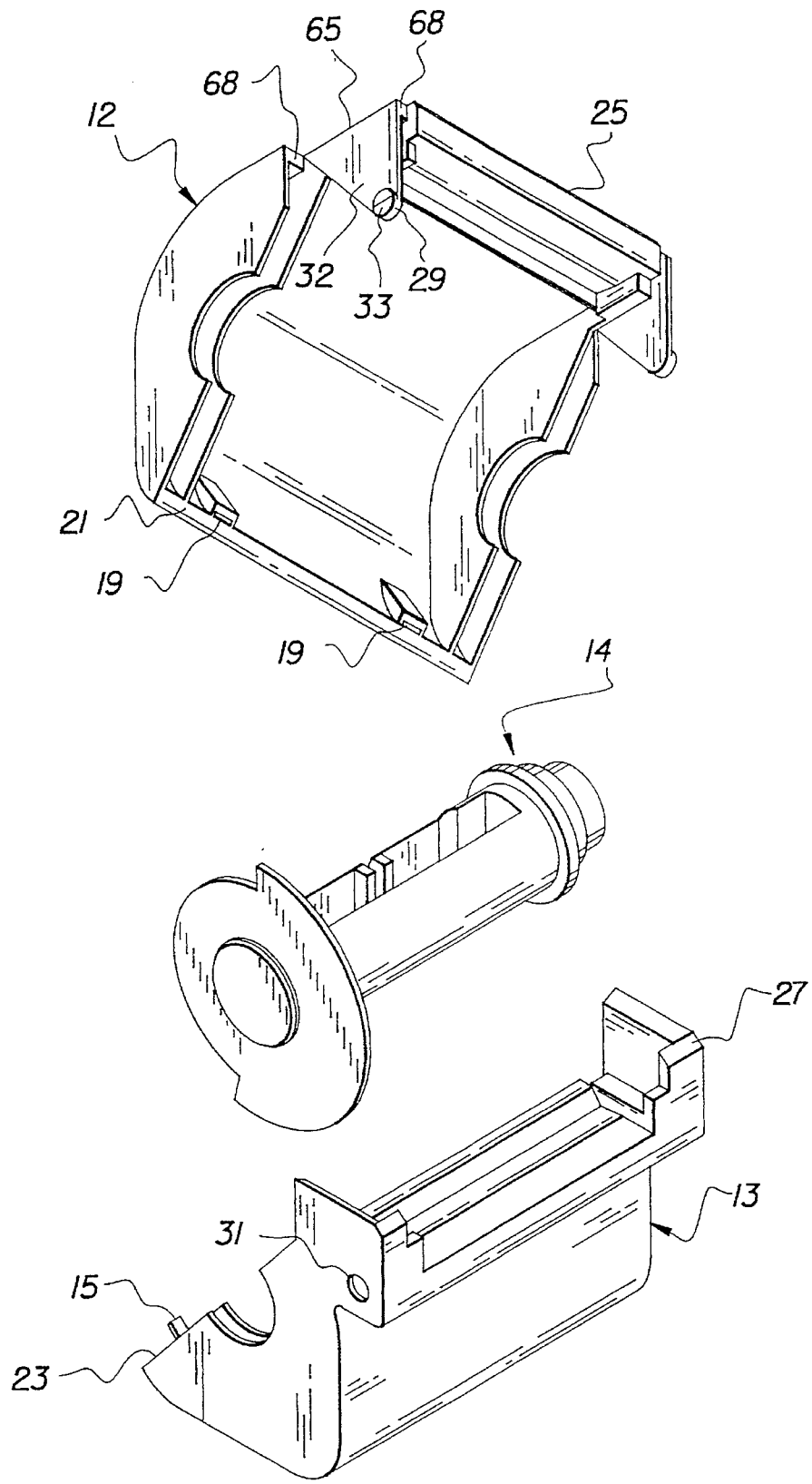
Figure 2:
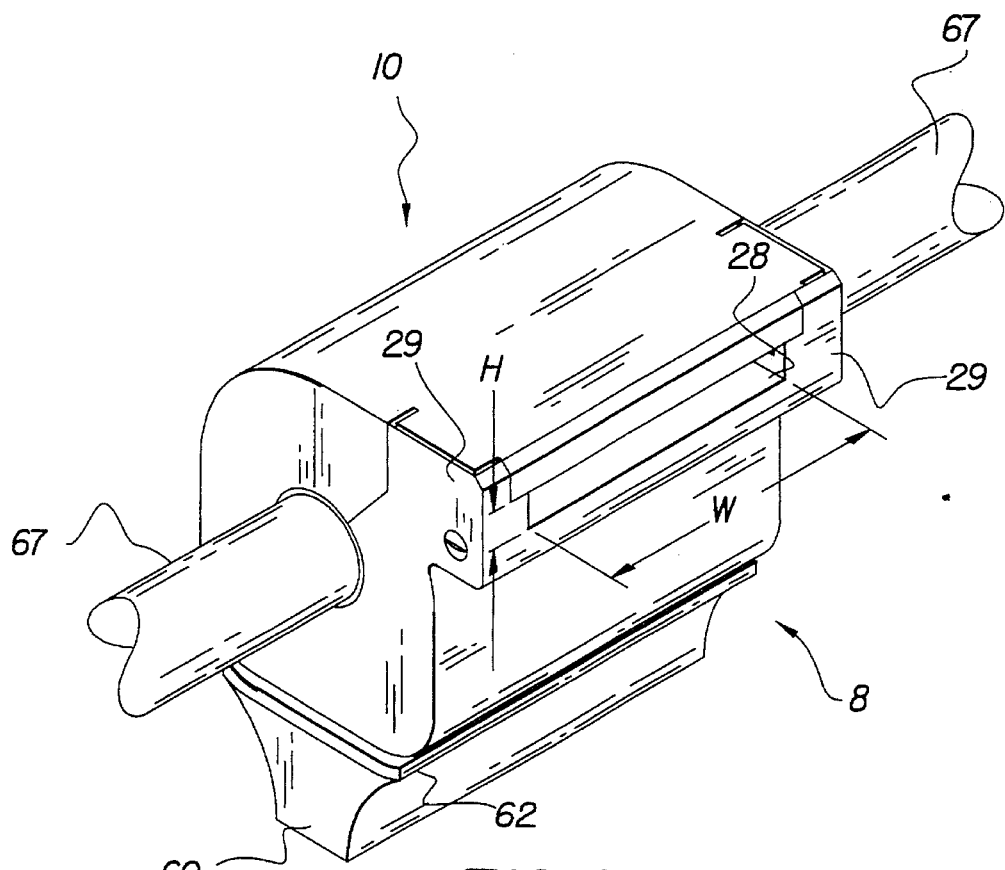

Referring now to the drawings, there is illustrated a film cartridge 10 for receiving a filmstrip 16. It is to be understood that any size filmstrip may be employed with the cartridge of the present invention, and in the particular embodiment illustrated, a 24mm size filmstrip is employed. A film cartridge 10 comprises an upper shell half 12 and a lower shell half 13. A film spool 14 is rotatably mounted to the lower shell half 13 and for rotation about an axis x—x in film winding and unwinding directions U and W inside the cartridge 10. The two shell halves 12,13 are secured together by interlocking projections and recesses. In particular, one of the shell halves 12,13 is provided with a pair of projections 15 having a terminal end 17 which engages a mating recess 19 formed in the adjacent shell half. The projections 15 and recesses 19 disposed at the lower edges 21,23 of the shell halves 12,13, respectively. The projections 15 and mating recesses 19 are formed such that when the other upper ends 25,27 of the shell halves 12,13 are open, the two shell halves pivot about the lower edges 21,23. A projection 29 is provided in upper shell half 12 which is designed to engage an opening 31 in the lower shell half 13. The projection 29 and mating opening are sized and shaped such that projection 29 substantially fills opening 31. As illustrated, the projection 29 is provided at the end of a flexible member 32 which 5 allows the projection 29 to be deflected a sufficient distance so as to allows disengagement and engagement with opening 31 as is later discussed herein. In the embodiment illustrated, lead portion 33 of projection 29 is beveled so as to assist in snapping projection into opening 31 as discussed later herein.

Figure 5:
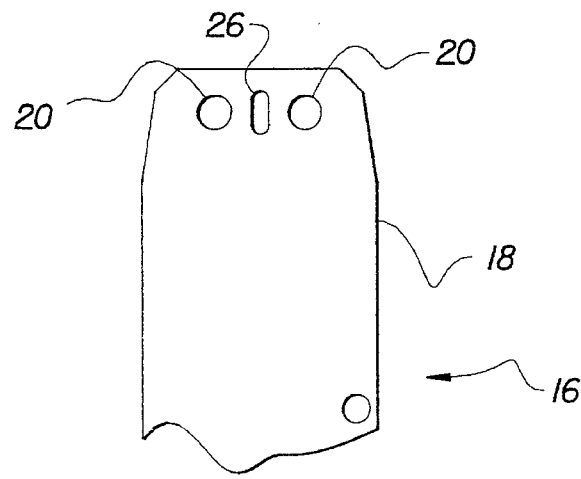
FIG. 5 is a top plan view of the trailing end portion of a filmstrip for use with the cartridge.

The filmstrip 16 is coiled about the film spool 14 to form successive convolutions of the filmstrip 16. Filmstrip 16 includes an inner or trailing end portion 18 (see FIG. 5) which is removably secured to the spool 14 (see FIGS. 6 and 7). In the particular embodiment illustrated, the trailing end portion 18 is provided with a pair of openings 20 which are designed to engage a pair of projections 22 formed in the hub 24 of the spool 14. The trailing end portion 18 is further provided with a drive opening 26 which, in the particular embodiment illustrated, is designed to engage an attachment tool, not shown, so that the trailing edge portion 18 can be guided into the cartridge for attaching the filmstrip 16 to the spool 14. One suitable method of attaching the filmstrip 16 to the spool 14 is described in copending application Ser. No. 08/171,790 entitled "Method and Apparatus for Attaching or Detaching a Filmstrip to a Film Cartridge", by Thomas C. Merle and Dale W. Ryan, which is hereby incorporated by reference.

The cartridge 10 is provided with a slot 28 for allowing a filmstrip 16 to be inserted or removed from the cartridge 10. In the particular embodiment illustrated, the opening 28 has a substantially 0 rectangular configuration. The particular height h and width w of the opening 28 is selected in accordance with the requirements of the cartridge and film size. In the particular embodiment illustrated, the opening 28 has a height h of 0.12 inches (0.30 cms) and a width w 5 of 1.12 inches (2.84 cms). The opening 28 is typically provided in a projecting portion 29 of the cartridge 10.

Appropriate means are provided in the projecting portion 29 of the cartridge 10 which prevents ambient light from entering the cartridge through opening 28. This may take the form of a typical plush as typically found in many current 35mm film cartridges, or may comprise of a light valve such as disclosed in U.S. Pat. Nos. 5,215,273 and 5,031,852, previously referred to and which are hereby incorporated by reference.

Figure 6:
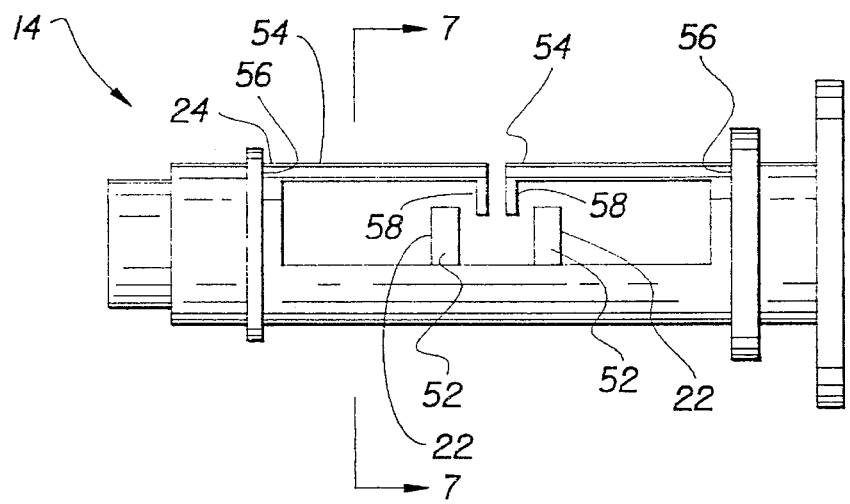
FIG. 6 is a front elevational view of the spool of the cartridge of FIG. 1.
Figure 7:
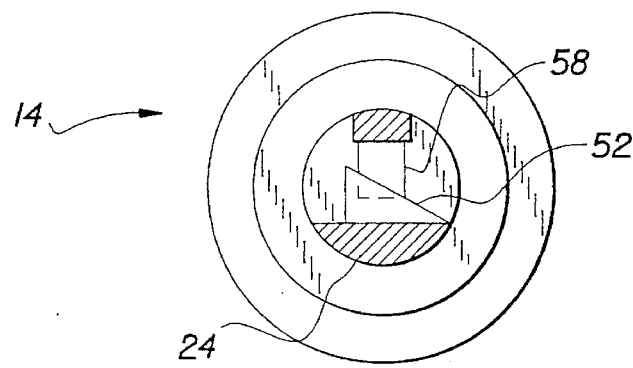
FIG. 7 is a cross sectional view of the spool of FIG. 6 as taken along line 7—7.

Referring to FIGS. 6 and 7, there is illustrated an enlarged view of the spool 14. The spool 14 includes a pair of spaced projections 22 disposed in the central area of the hub 24 and are designed to engage openings 20 in the trailing end portion 18 of filmstrip 16. Preferably, as illustrated, projections 22 are provided with an inclined surface 52 which assists in the attachment of the filmstrip 16 as is discussed later herein. Spool 14 is also provided with a pair of flexible retaining members 54 which extend from each of the lateral ends 56. Retaining members each terminate in a downwardly extending contact members 58. The flexible retaining members 54 assist in retaining the trailing end 18 of the filmstrip 16 on the spool 14 once projections 22 engage openings 20.

Figure 3:
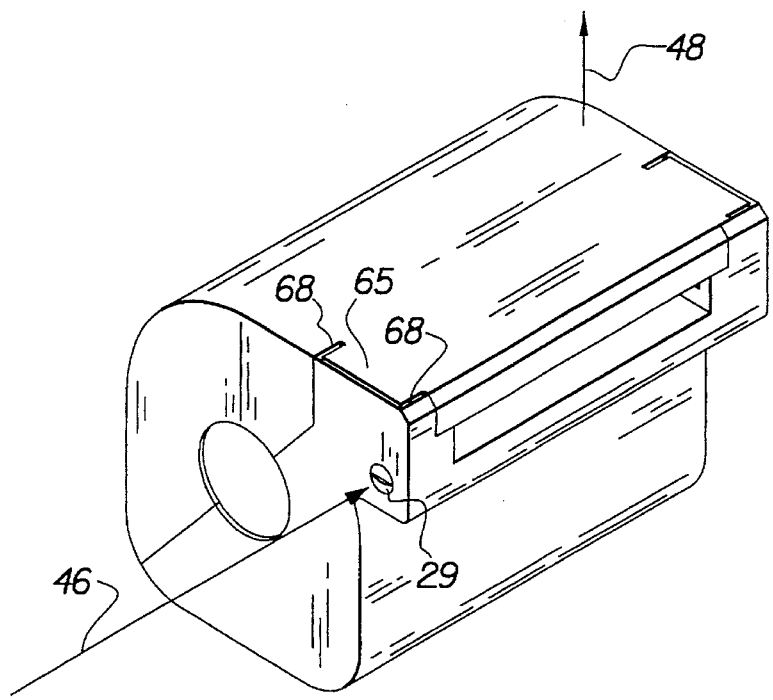
FIG. 3 is similar to FIG. 2 partially broken away to illustrate how the cartridge is secured together.
Figure 4:
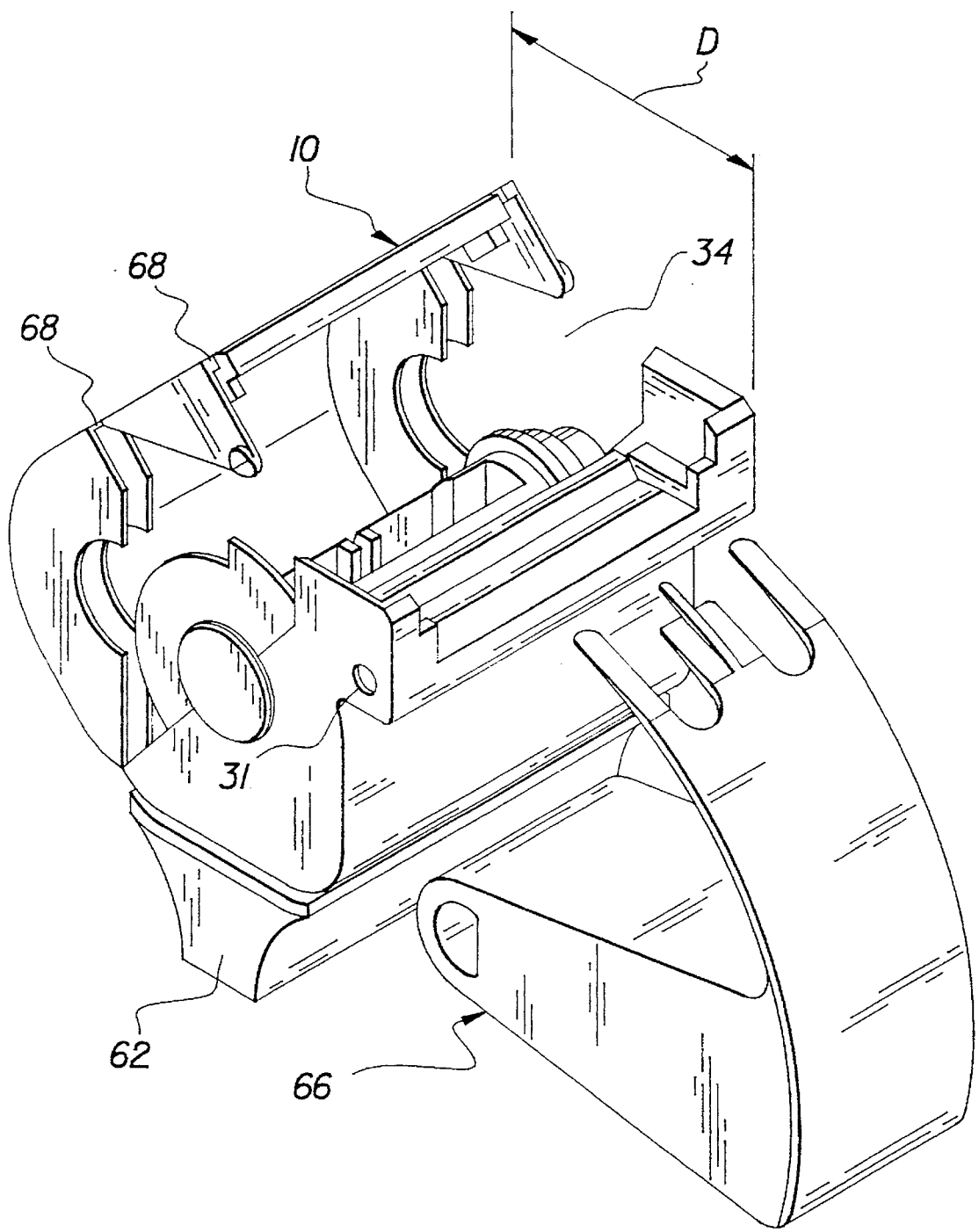
FIG. 4 illustrates the cartridge in the open state and the relative positioning of a tool used for attaching and/or detaching a filmstrip from the spool.

The cartridge 10 is designed to be placed in an apparatus 8, for example, a photofinishing device such as a processor, printer, or any other device where it is necessary to insert or remove the filmstrip from the cartridge. In the particular embodiment illustrated, apparatus 8 includes means for securely holding the cartridge 10 in a fixed position. In the particular embodiment illustrated, the apparatus includes a clamp members 62 which is used to maintain the lower shell half 13 in a fixed position relative to the frame 60. A pair of mounting member 67 rotatably mounted to the frame 60 are provided for engaging the lateral ends of the spool 14. One of the mounting members 67 is driven for winding or unwinding the filmstrip 16 on to the spool 14. A stepper motor could be used to drive mounting member 67. The mounting member 67 also holds the spool 14 in position when the cartridge 10 is opened as is discussed later herein. The apparatus may be further provided with an attachment/detachment tool 66 which is rotatably mounted to the frame 60 for moving between an engaged position and a nonengaged position with respect to the cartridge 10. Referring to FIG. 4, an attachment tool 66 is illustrated in the nonengaged position. In order to allow appropriate access to the interior of the cartridge 10 while minimizing the degree of precision in which the cartridge must be made and the precise positioning of the tool 66, the upper shell half 12 of the cartridge is made such that a wide access opening 34 is provided between the upper and lower shell halves 12,13. In particular, when upper projection 29 is pushed inward by an appropriate tool a sufficient distance, as indicated by arrow 46 in FIG. 3, the projection 29 will disengage from opening 31. An appropriate grasping tool/mechanism, not shown, is used to apply a separating force at the edges, in a direction as indicated by arrow 48 in FIG. 3, the two halves 12,13 will be rotated apart allowing the upper shell half to pivot about the lower edges. The upper ends 25,27 of the shell halves 12,13 are moved a predetermined distance D apart such that an access opening 43 is provided. The distance D in FIG. 4 is greatly exaggerated for the purpose of clarity in viewing the cartridge features. Preferably, the 5 rotation of the upper shell half 12 is such that an access area of sufficient size is provided to allow easy access of a tool within the cartridge 10 for attaching or detaching the filmstrip 16 to the spool 14. Preferably, the distance D is at least 2.5mm and preferably is in the range of 3mm to 5mm. It is, of course, understood that the size of the access opening 34 will vary depending on the cartridge configuration and the requirements of the tool used to attach or detach the filmstrip. The distance D is preferable such that the filmstrip 16 can be wound or unwound while the cartridge is in the open state. Thereafter, the tool 66 is positioned in the engaged position for allowing attachment or detachment of the film to the spool 14. A more detailed description of a attachment/detachment tool and method of attachment/detachment of the filmstrip to the spool which can be used in the present invention is described in copending applications Ser. No. 08/098,112 and Ser. No. 08/171,790, previously referred to and incorporated by reference.

After attachment or detachment of the filmstrip 16 has occurred, the tool 66 is removed and the upper shell half 12 is closed with respect to the bottom shell half 13. In the particular embodiment illustrated, this is accomplished by moving the top shell half 12 toward shell half 13 so as to allow the projection 29 to slide and ride upon the side of the lower shell half 13 until it snaps into the opening 31 thereby locking the bottom and top shell halves 12,13 0 together. Pushing on areas 65 of shell half 12 is preferably used as the area for applying a closing force since a pair of slots 68 provided adjacent the flexible member 32 which assists in allowing projection 29 to deform slightly during the snapping together of the bottom and top shell halves 12,13.

It is to be understood that various locking and unlocking mechanisms may be used for securing the top shell half 12 and bottom shell half 13 together. Additionally, various other means may be provided for allowing separation of the top shell half with respect to the bottom shell half 13. For example, a hinge may be used to allow the shell half 12 to pivot at lower edges 21,23. While in the preferred embodiment the entire top shell half 12 is removed, it is to be understood that only a section or portion thereof need be removed for allowing insertion of a tool into the cartridge 10 for attaching or detaching the filmstrip 16.

It is to be understood that various other changes and modifications may be made without departing from the scope of the present invention. The present invention being defined by the claims that follow.

PART LIST

8. . . apparatus
10. . . cartridge
12. . . upper shell half

13. . . lower shell half
14. . . spool
15. . . projections
16. . . filmstrip
17. . . terminal end
18. . . trailing end portion
19. . . recess
20. . . openings
21,23. . . lower edge
22. . . projections
24. . . hub
25,27. . . upper ends
26. . . drive opening
28. . . opening
29. . . projecting portion
31. . . opening
32. . . flexible member
33. . . lead portion
34. . . access opening
41. . . upper projection
43. . . access opening
46,48. . . arrows
52. . . inclined surface
54. . . retaining members
56. . . lateral ends
58. . . contact members
60. . . frame
62. . . clamp members
65. . . areas
66. . . attactment tool
67. . . mounting members
68. . . slots

I claim:

1. A method of attaching a filmstrip to a film cartridge, said cartridge having a spool rotatably mounted therein and a discharge opening through which said filmstrip passes when said cartridge is in the assembled condition, said cartridge having a movable section with respect to said cartridge without substantially effecting the operation of said spool, means for locking and unlocking said movable section with respect to said cartridge, said means for unlocking and locking comprising a flexible section provided on said movable section and having a projection designed to engage a locking opening on said cartridge, said flexible section being designed to deflect a sufficient distance to allow disengagement of said movable section by being pushed inward, comprising the steps of:

unlocking said movable section by pushing axially inward upon said flexible member;

opening said movable section so as to form an access opening for allowing attachment of the filmstrip to the spool while said spool is within said cartridge, said access opening being of greater dimension than said discharge opening;

providing a tool for attaching a filmstrip to said spool;

moving said tool into said cartridge through said access opening to a position which would allow the filmstrip to be secured to said spool;

inserting the film into said cartridge through said access opening and attaching said filmstrip to said spool;

removing said tool from said cartridge; and closing said movable section so as to return said cartridge to its normally closed position.

2. A method according to claim 1 further comprising the step of winding said filmstrip about said spool after said tool has been removed from said cartridge.

3. A method of attaching a filmstrip to a film cartridge having a spool rotatably mounted therein, said cartridge comprising a top shell portion and bottom shell portion, said cartridge having a film through which film passes when said cartridge is in the assembled condition, said top and bottom shell portions being secured such that said top shell portion is adapted to be pivotably moved with respect to the bottom shell portion so as to form an access opening for allowing attachment of the filmstrip to the spool, said spool being rotatably mounted to said bottom shell portion, said cartridge having latching means for allowing opening and closing of said shell portions with respect to each other, said means for unlocking and locking comprising a flexible section provided on said movable section and having a projection designed to engage a locking opening on said cartridge, said flexible section being designed to deflect a sufficient distance to allow disengagement of said movable section by being pushed inward, comprising the steps of:

a. unlocking said movable section by pushing axially inward upon said flexible member;

b. unlatching said latching means so that said top shell portion is moved with respect to said bottom shell portion;

c. opening said top shell portion a predetermined distance so as to form said access opening, said access opening being of greater dimension than said discharge opening;

d. inserting a tool through said access opening into said cartridge to an engaging position;

e. introducing the filmstrip into said cartridge and attaching said filmstrip to said spool while said spool is within said cartridge;

f. removing said tool after said filmstrip has been attached to said spool; and g. closing said top shell half with respect to said bottom shell half and locking said latching means so as to return the cartridge to its normal operating condition.

4. A method according to claim 3 wherein said cartridge is of the thrust type wherein the film may be thrust from the film opening by rotating the spool.

5. A method of attaching a filmstrip to a thrust film cartridge, said thrust cartridge having a spool rotatably mounted therein and a discharge opening through which said passes when said thrust cartridge is in the assembled condition, said thrust cartridge having a movable section with respect to said thrust cartridge without substantially effecting the operation of said spool, means for locking and unlocking said movable section with respect to said thrust cartridge, said means for unlocking and locking comprising a flexible section provided on said movable section and having a projection designed to engage a locking opening on said cartridge, said flexible section being designed to deflect a sufficient distance to allow disengagement of said movable section by being pushed inward, comprising the steps of:

unlocking said movable section by pushing axially inward upon said flexible member;

opening said movable section so as to form an access opening for allowing attachment of the filmstrip to the spool, said access opening being of greater dimension than said discharge opening;

providing a tool for attaching a filmstrip to said spool while said spool is within said cartridge;

moving said tool into said thrust cartridge through said access opening to a position which would allow the filmstrip to be secured to said spool;

inserting the film into said thrust cartridge through said access opening and attaching said filmstrip to said spool;

removing said tool from said thrust cartridge; and closing said movable section so as to return said thrust cartridge to its normally closed position.

6. A method of attaching a filmstrip to a film cartridge, said cartridge having a spool rotatably mounted therein and a discharge opening through which said filmstrip passes when said cartridge is in the assembled condition, said cartridge having a movable section with respect to said cartridge without substantially effecting the operation of said spool, means for locking and unlocking said movable section with respect to said cartridge, said means for unlocking and locking comprising a flexible section provided on said movable section and having a projection designed to engage a locking opening on said cartridge, said flexible section being designed to deflect a sufficient distance to allow disengagement of said movable section by being pushed inward, comprising the steps of:

unlocking said movable section by pushing axially inward upon said flexible member;

opening said movable section so as to form an access opening for allowing attachment of the filmstrip to the spool while said spool is in said cartridge, said access opening being of greater dimemsion than said discharge opening;

providing a tool for attaching the filmstrip to said spool;

moving said tool into said cartridge through said access opening to a position which would allow the filmstrip to be secured to said spool;

attaching said filmstrip to said spool;

removing said tool from said cartridge; and closing said movable section so as to return said cartridge to its normally closed position.

7. A method according to claim 6 further comprising the step of winding said filmstrip about said spool after said filmstrip has been attached to said spool.

8. A method of detaching a filmstrip from a film cartridge, said cartridge having a spool rotatably mounted therein and a discharge opening through which said filmstrip passes when said cartridge is in the assembled condition, said cartridge having a movable section with respect to said cartridge without substantially effecting the operation of said spool, means for locking and unlocking said movable section with respect to said cartridge, said means for unlocking and locking comprising a flexible section provided on said movable section and having a projection designed to engage a locking opening on said cartridge, said flexible section being designed to deflect a sufficient distance to as to allow disengagement of said movable section by being pushed inward, comprising the steps of:

unlocking said movable section by pushing axially inward upon said flexible member;

opening said movable section so as to form an access opening for allowing detachment of the filmstrip from the spool while said spool is in said cartridge, said access opening being of greater dimemsion than said discharge opening;

providing a tool for detaching the filmstrip from said spool;

moving said tool into said cartridge through said access opening to a position which would allow the filmstrip to be detached with respect to said spool;

detaching said filmstrip from said spool;

removing said tool from said cartridge; and closing said movable section so as to return said cartridge to its normally closed position.

* * * * *